UNITED STATES PATENT OFFICE.

CARL FREDRIK JAKOB FORSSELL, OF LAKEWOOD, OHIO, ASSIGNOR TO NATIONAL CARBON COMPANY, OF CLEVELAND, OHIO, A CORPORATION OF NEW JERSEY.

PROCESS OF GRAPHITIZING.

983,887.

No Drawing.

Specification of Letters Patent. Patented Feb. 14, 1911.

Application filed April 22, 1907. Serial No. 369,480.

*To all whom it may concern:*

Be it known that I, CARL FREDRIK JAKOB FORSSELL, a subject of the King of Sweden, residing at Lakewood, in the county of Cuyahoga and State of Ohio, have invented a certain new and useful Improvement in Processes of Graphitizing, of which the following is a full, clear, and exact description.

The object of the present invention is to provide a new method of graphitizing particularly adapted to converting amorphous carbon into the graphitic form.

The methods of graphitizing previously known are few in number, particularly such methods as are capable of use commercially, which methods are based upon different phenomena, scientific knowledge on which subject not having reached a state where the underlying laws controlling allotropism of carbon can be stated. Some generalizations have been made by workers in the art, but these have been of value only to the individual process on which they were based, and when they have been stated in terms broader than this so as to forecast or predict as to matters concerning which the actual work had not been done, these generalizations have been of no value.

My process of graphitizing is founded fundamentally upon the discovery that when carbon is subjected to heat, together with a compound, with a part of the constituent elements of which compound the carbon will combine to form a gas, which gas is, under the conditions maintained, capable of being reduced, it is possible by disturbing the equilibrium of the vapors present there, to cause the carbon-containing gas to deposit the carbon in the form of graphite.

My invention relates to this method of procedure, and I do not seek to have the invention construed to be of any greater scope, as the general rule based upon the specific procedure which I prefer to follow is all that I desire to claim as my own invention.

In conformance with the general principles of my process as above stated, a limited number of substances may be used for effecting the graphitization of carbon and carbon articles, such substances, as for example, magnesia and its equivalents, but these equivalents should be true equivalents, within the limits of the general rule set forth, of course. While other persons working in the art may have referred to magnesia as capable of use for this purpose, nevertheless it has not been so used, and until my process was developed there was no knowledge extant such as would justify the assumption that it could be used or such as would lead one to experiment with it. Indeed, all previous known facts have been inconsistent with the idea that magnesia or its equivalents could be so used.

In practice, I prefer to use magnesia as the compound with which to heat the carbon, the carbon of course being other than in the graphitic form. The magnesia should preferably be mixed in the carbons, though it is possible to obtain partial graphitization and effective results by packing the carbons in magnesia. I will now describe a process of graphitizing carbon articles in which the magnesia is not in the mix.

The carbons themselves are ordinarily petroleum coke carbons containing only such impurities as accompany the raw materials and as are accumulated during the course of manufacture. The total percentage of ash in the carbons, baked preliminarily, amounts to .2 to .3 per cent. and sometimes less. These carbons are packed in an electric furnace of suitable type having resisters of proper form and construction, it being understood that they have been previously baked, by preference, as there are certain practical difficulties in baking them in the electric furnace, though this could be done if necessary. The carbons are packed in compartments between the resisters and powdered magnesia is used as a packing material. The carbons are not allowed to touch the resister walls for fear of short-circuiting the current across the compartments and therefore a layer of magnesia one-fourth of an inch thick is packed between the carbons and the resister walls. When the compartments are filled a course of carborundum fire-sand brick is placed on the top and then a layer of magnesia 4 to 5 inches deep spread over the furnace. The furnace is then covered with movable arched fire-brick covers and the gas fire started. In this way the furnace is preheated by means of gas firing up to a temperature of about 900°. This heating lasts from four to five days. While the gas is still burning all the time to keep the outside hot, thus diminishing losses of the heat generated inside, the electric current is now turned on.

In figuring the total energy required for the furnace, it has been found suitable to suppose that double the amount of heat per square inch passes through the top of the resister as through the sides and bottom. The losses through top and bottom thus derived are added to the energy distributed into the compartments. To this sum is further added the energy consumed in heating the resisters proper. Assuming the temperature rise in them to be 1000° C. (900–1900), this total sum gives the energy needed for the electric bake, this bake lasting for about 18 hours. It will run with voltage varying from 75 at the start to about 45 at the end of the run. After the electric run the gas fire is left burning for about six hours in order to give the heat inside time to distribute more evenly. From conditions obtaining I compute the average temperature in the compartments not to be above about 1700° C. and probably to lie between 1600° and 1700°. The extent of graphitization will depend somewhat upon the length of time the furnace is allowed to run. It will not be feasible to reach a higher temperature than 1800 to 1900° C. in the furnace when working in this way because the magnesia packing will melt slightly above the last mentioned temperature. By incorporating the magnesia in the carbons and using a more refractory packing material than the powdered magnesia, it is possible to reach a higher temperature in order to graphitize completely, if this should be thought preferable. In this latter case the energy consumption will probably be higher than the figures given. These figures therefore should be looked upon only as applying to a special case.

It will be immediately noted, of course, that the utilization of magnesia to effect graphitization is inconsistent, on its face, with the present known methods of graphitizing, the principal one of which is based upon the selection of such elemental substances as, in their elemental state or in compounds, are capable of reacting or combining with carbon to form a compound therewith at the temperature of the electric furnace, in which the process is carried out, which compound is decomposed, the carbon being thrown out in graphitic form. This prior process and the fundamental facts known about the same may be summed up in their broadest statement in the language just given and the materials used in this process are selected along these lines, such materials being used, for example as iron oxid, the base of which compound, the iron, is capable of combining with the carbon to form a compound (commonly called a carbid) which is decomposed upon continued heating and sufficient rise in temperature so that the carbon is thrown out in a graphitic form and the iron released for further reaction. A process limited in the selection of its material by the principle which I have just outlined, as governing the prior process, would obviously exclude magnesia from consideration, since all of the facts previously known and known to those practicing methods of graphitization, are inconsistent in its employment in the manner in which iron oxid or its equivalents are employed in such process.

Magnesium is a substance which is not capable of reacting or combining with carbon to form a compound therewith at the temperature of the electric furnace, as a carbid of magnesium cannot exist at the temperatures of the electric furnace, a fact well known to such authorities as Moissan, Acheson and Fitzgerald. The reaction which takes place when magnesia is heated with carbon to such an extent as to cause reaction to take place is known to be thus:

$$MgO+C=Mg+CO.$$

That is, the carbon reduces the magnesium oxid forming metallic magnesium and carbon monoxid. But suppose it were possible at a low temperature for the magnesium to combine with a carbon to form a compound, the reaction would take place as follows:

$$MgO+3C=MgC_2+CO.$$

This reaction, however, resulting in the carbid of magnesium, obviously could not take place at the temperature of an electric furnace, as magnesium carbid cannot form at that temperature. See statements of Moissan in his book entitled "*The Electric Furnace*," pages 211 and 240. In order, therefore, that those skilled in the art may sufficiently understand the action of magnesia in this connection to properly use the same and to properly select chemical equivalents for carrying out the process, I will now set forth the laws governing the process and the selection of materials therefor.

When carbon and magnesium oxid, or magnesia, are heated together to a sufficient temperature, the following reaction will take place to some extent:

$$C+MgO=Mg+CO$$

i. e. the carbon reduces the magnesium oxid, forming metallic magnesium and carbon monoxid. As the temperature in the furnace is above the boiling point of magnesium it can only exist here in the gaseous state. Both products of the reaction are consequently gases. On the other side the magnesium oxid on the left hand has quite appreciable vapor pressure at the temperatures in question. The vapor pressure of carbon, although small, is also of importance. The reaction, discussed, is therefore not complete, but represents an equilibrium between gases, thus:

$$C + MgO \rightleftarrows Mg + CO.$$

A certain equilibrium will establish itself for each temperature, in such way that with rising temperature more magnesium is formed i. e. the reaction proceeds from left to right until reaching a new equilibrium. If the temperature is lowered, however, the opposite takes place and magnesium reduces carbon monoxid, depositing carbon and magnesium oxid in solid state because the surrounding atmosphere is already saturated with their vapor. In the electric furnace these reactions take place. The magnesia is in contact with the carbon packed, and therefore a reduction of the magnesium oxid into magnesium vapors and carbon monoxid, to an extent, determined by the temperature prevailing, will occur. The gases, thus formed, will diffuse into the adjoining parts of the carbon articles of a somewhat lower temperature. As stated the reverse reaction then takes place, carbon and magnesium oxid being deposited. As the temperature then further rises, in the furnace, this magnesium oxid will again be reduced and thus gradually be transported toward the interior of the carbons.

It is generally known that graphite, at least at temperatures above a few hundred degrees (C.), is the most stable modification of carbon. The relative properties of the different modifications of carbon, amorphous carbon, diamond and graphite have been studied very thoroughly by means of the reaction.

$$C + CO_2 \rightleftarrows 2CO.$$

According to this, carbon reduces carbon dioxid, forming carbon monoxid. This reaction is favored by high temperature, being nearly complete at 1000° C. On the other hand carbon monoxid decomposes into free carbon and carbon dioxid. At about 400° this opposite reaction is almost complete. In the intermediate temperature range the equilibrium changes gradually with rising temperature in favor of the carbon monoxid, a certain equilibrium between the gases corresponding to each temperature. But this equilibrium is different according to the modification of carbon in contact with the gas mixture. This circumstance has made it possible to compute the relative vapor pressures of the different modifications of carbon and their variation with the temperature. In this way it was found that graphite has the lowest vapor pressure and amorphous carbon the highest. Thus the vapor pressure of amorphous carbon is 3.7 times higher than that of graphite at 500° C., but 5.4 times higher at 641° C. From the rate of this change it may be concluded that at the temperatures around 1500° the amorphous carbon has a vapor pressure many times larger than that of graphite. This fact will be referred to later.

Another result of these investigations was that carbon monoxid, when decomposing to a certain extent into carbon dioxid and free carbon, when no kind of carbon was present at the start, assumed the equilibrium corresponding to the segregation of graphite carbon. This occurrence is only a natural consequence of the fact that graphite has the lowest vapor pressure or, in other words, is more stable. This phenomenon has a direct bearing upon the process in my furnace.

From the above reasons, as advanced for the reaction last described, it is obvious that the carbon deposited from the reduction of carbon monoxid by magnesium in my furnace, must be graphitic carbon.

As we have seen the magnesium oxid penetrates into the carbons, baked, gradually by subsequent reductions and redepositing carrying down with it carbon now shown to be graphite. It could be feared that when the magnesium oxid is again reduced on account of the rising temperature the graphite carbon, just deposited with it, would be consumed in the reduction. There is, however, no danger of this loss, since the amorphous carbon, present, has so much higher vapor pressure and consequent reducing activity. As an example of this it may be cited that a magnesia lining in a graphite crucible used for melting steel in an electric furnace stood up well, while it was eaten away quickly when applied to an amorphous carbon crucible. Further, as mentioned in connection with the discussion of the equilibrium between carbon and carbon dioxid on one side and carbon monoxid on the other, the equilibrium is different according to the modification of carbon present. The same will be the case with the equilibrium between carbon and magnesium oxid on one side and magnesium and carbon monoxid on the other side, assumed in my furnace. The amorphous carbon demands one equilibrium, the graphite, formed, another, on account of the difference in their vapor pressures. The equilibrium, established in the system with amorphous carbon, therefore, cannot exist in a stable condition in the presence of graphite, just as water, cooled below the freezing point cannot exist in the presence of ice. Carbon will consequently be deposited as graphite from the amorphous carbon system. This equilibrium will then continuously reëstablish itself as long as there is any amorphous carbon left. Thus a transfer of the carbon, baked, into graphite will gradually take place, at sufficiently high though constant temperature.

The specific process of graphitizing, outlined above as involving the use of magnesia, is obviously based upon the reduction of magnesium oxid by carbon into the metal magnesium as vapor and carbon monoxid, and consequent reduction by the metal vapors of the carbon monoxid, depositing, graphitic carbon. An essential condition for the success of this process is that the metal in question does not form a carbid with the carbon, present in excess, when liberated, thus preventing the possibility of the cycle described. It is known that magnesium does not form a carbid at the temperatures employed and to this fact is due the graphitizing in my furnace as set forth.

Having thus described my invention, I claim:

1. The process of graphitizing carbon which consists in subjecting to heat carbon and magnesia in an electric furnace above the temperature at which magnesium carbid can be formed until graphitization is effected.

2. The process of graphitizing carbon which consists in subjecting to heat carbon articles packed in magnesia at a temperature above that at which magnesium carbid can be formed until graphitization is effected.

3. The process of graphitizing carbon which consists in subjecting to heat carbon and a compound, with a part of the constituent elements of which compound said carbon will combine, at a temperature above that at which the carbid of the base of said compound can be formed until graphitization is effected.

In testimony whereof, I hereunto affix my signature in the presence of two witnesses.

CARL FREDRIK JAKOB FORSSELL.

Witnesses:
JOHN A. ALBURN,
J. M. WOODWARD.